United States Patent [19]
Cox et al.

[11] Patent Number: 5,873,032
[45] Date of Patent: Feb. 16, 1999

[54] METHOD AND SYSTEM FOR PROVIDING DIRECTORY ASSISTANCE SERVICES DURING ATTEMPT TO COMPLETE CUSTOMER OR AFTER CALL TERMINATION VIA AN ALPHANUMERIC PAGE

[75] Inventors: Patrick M. Cox, Beaverton; Adrian P. Powell, Colton; Paul W. Filliger, Silverton; Michael A. Kepler, Aloha; Timothy A. Timmins, Tigard, all of Oreg.

[73] Assignee: Metro One Telecommunications, Inc., Beaverton, Oreg.

[21] Appl. No.: 620,374

[22] Filed: Mar. 22, 1996

Related U.S. Application Data

[63] Continuation-in-part of Ser. No. 552,222, Oct. 31, 1995, which is a continuation-in-part of Ser. No. 498,900, Jul. 6, 1995, abandoned, which is a continuation-in-part of Ser. No. 234,644, Apr. 28, 1994, abandoned.

[51] Int. Cl.$^6$ ....................................................... H04Q 7/08
[52] U.S. Cl. ............................................................. 455/414
[58] Field of Search ..................................... 455/414, 416, 455/417; 379/114, 212, 88, 97; 364/460

[56] References Cited

U.S. PATENT DOCUMENTS

| | | |
|---|---|---|
| 4,112,257 | 9/1978 | Frost . |
| 4,608,460 | 8/1986 | Carter et al. . |
| 4,640,986 | 2/1987 | Yotsutani et al. . |
| 4,677,609 | 6/1987 | Piereth et al. . |
| 4,777,646 | 10/1988 | Harris . |
| 4,908,825 | 3/1990 | Vea . |
| 4,908,850 | 3/1990 | Masson et al. . |
| 4,932,042 | 6/1990 | Baral et al. . |
| 4,958,368 | 9/1990 | Parker . |
| 4,959,855 | 9/1990 | Daudelin . |
| 4,965,821 | 10/1990 | Bishop et al. . |
| 4,979,206 | 12/1990 | Padden et al. . |
| 4,979,207 | 12/1990 | Baum et al. . |
| 5,056,134 | 10/1991 | Bauer et al. . |
| 5,063,591 | 11/1991 | Jodoin . |

(List continued on next page.)

FOREIGN PATENT DOCUMENTS 2-17752  1/1990  Japan .

OTHER PUBLICATIONS

Guiard, Le Moign, Marchand, "The Electronic Directory Within the Company," Commutation & Transmission #2–1983, pp. 53–66.

"Directory Assistance System," British Telecommunications Engineering, vol. 5, Jan. 1987, pp. 294–295.

Primary Examiner—William Cumming
Attorney, Agent, or Firm—Pennie & Edmonds LLP

[57] ABSTRACT

A mobile telephone, or personal communication services subscriber who wishes directory assistance services is connected in the conventional manner to an operator who identifies a destination telephone number desired by the subscriber. As known in the prior art, the operator then initiates a call connecting the subscriber to the destination telephone number. In a preferred embodiment, the operator locates a desired destination telephone number in a computer database, and can select automatic dialing of the located number. Further, rather than dropping all further involvement with the call, the preferred embodiment of the present invention continually monitors the connection thereby established for a predetermined DTMF signal issued by the customer, such as that obtained by pressing the "*" button. If such a signal is detected, the customer is transferred to a directory assistance operator, who can then provide whatever further assistance is needed (e.g., providing further directory assistance). If a busy signal or non-answering party is detected, a customer is given a plurality of options including leaving a recorded message or page, or a predetermined alphanumeric message or page for the called party. In this case, the system automatically tries, repeatedly, to deliver the recorded message or page and, optionally, confirms successful or failed message delivery to the calling party.

28 Claims, 11 Drawing Sheets

U.S. PATENT DOCUMENTS

| | | |
|---|---|---|
| 5,095,503 | 3/1992 | Kowalski . |
| 5,109,401 | 4/1992 | Hattori et al. . |
| 5,148,472 | 9/1992 | Freese et al. . |
| 5,163,083 | 11/1992 | Dowden et al. . |
| 5,181,237 | 1/1993 | Dowden et al. . |
| 5,187,740 | 2/1993 | Swaim et al. . |
| 5,222,120 | 6/1993 | McLeod et al. . |
| 5,369,684 | 11/1994 | Buhl et al. . |
| 5,450,476 | 9/1995 | D'Apuzzo et al. . |
| 5,515,285 | 5/1996 | Garrett, Sr. et al. ............ 364/460 |
| 5,588,042 | 12/1996 | Comer . |

METHOD AND SYSTEM FOR PROVIDING DIRECTORY ASSISTANCE SERVICES DURING ATTEMPT TO COMPLETE CUSTOMER OR AFTER CALL TERMINATION VIA AN ALPHANUMERIC PAGE

RELATED APPLICATION DATA

The present application is a continuation in part of copending application Ser. No. 08/552,222 filed Oct. 31, 1995, pending, which is a continuation in part of application Ser. No. 08/498,900, filed Jul. 6, 1995, now abandoned, which is a continuation in part of application Ser. No. 08/234,644, filed Apr. 28, 1994, now abandoned.

FIELD OF THE INVENTION

The present invention relates to systems for providing directory assistance services. More particularly, the present invention relates to a directory assistance service with flexible connection options so that a caller can more readily communicate with a party that is presently unavailable.

BACKGROUND AND SUMMARY OF THE INVENTION

Telephone directory assistance services have been available for the past century. While improvements have been made over the decades, such systems are still poorly suited for many users, including in particular, subscribers of mobile telephone services (e.g., cellular and personal communications service ("PCS") subscribers).

In prior art directory assistance services, a customer dials an operator and identifies the name and address of a party whose telephone number is desired. The operator then locates the number, using printed directories or a computer database, and provides the number to the customer. (The provision of the number is sometimes done by the live operator, but more typically is done with a synthesized voice response unit that provides an automated voicing of the number.) After the customer's inquiry has been satisfied, the connection to the operator is terminated.

While satisfactory for most customers, this arrangement is ill-suited for many mobile telephone and/or PCS customers. For one, such customers are usually away from their general work environments (e.g., in a vehicle), and thus may not have ready access to a pencil and paper in order to make a note of the desired number. (Even if such materials are available, the customer may not find it convenient to interrupt other activities, e.g., driving, in order to make a note.) In addition, the process of initiating a second call—to the desired party—entails further manual operations (e.g., hanging up, waiting for another dial tone, and dialing) which may be a hindrance to the customer's other activities.

The present assignee has redressed certain of these difficulties by providing a directory assistance service that eliminates the need to make a note of the desired number, or undertake a redialing exercise. Instead, after determining the telephone number desired by the customer, rather than voicing it to the customer, the directory assistance operator proceeds to initiate a call to the desired party, and connects the new outgoing call to the original customer. This arrangement obviates the need for the customer to make a note of the voiced number, or to undertake a redialing exercise. However, the number can still be voiced to the customer if desired.

Rather than dropping all further involvement with the call, as is typically done with most directory assistance systems, the assignee's directory assistance system continually monitors the connection thereby established for a predetermined DTMF signal issued by the customer, such as that obtained by pressing the "*" button. If such a signal is detected, the customer is transferred to a directory assistance operator, who can then provide whatever further assistance is needed. By this arrangement, the press of a single button by the customer summons further directory assistance, rather than the redialing procedure normally required.

However, if the initiated call is not completed because a "busy" tone is received, or a continuous ringing signal for a non-answering party is received, then the customer must either immediately contact the directory assistance operator again (e.g., with the press of a single button as was described above) or hang-up and re-connect to the directory assistance operator again at a later time by undertaking a redialing exercise.

If the caller re-connects to the directory assistance operator, the operator can re-initiate the call, but if the line is busy, or the party is not answering, then the caller must either write down the desired number, or call the directory assistance service again at a later time. Both of these options are unsatisfactory for many cellular telephone customers as they disrupt the customer's activities.

In accordance with one preferred embodiment of the present invention, a directory assistance service is provided which alleviates the busy signal and non-answering parties problems. For example, in one embodiment, a caller who wishes directory assistance services is connected in the conventional manner to a directory assistance operator who determines the destination telephone number desired by the caller. The operator and the system then initiates the call connection to the destination telephone number for the caller.

If a busy signal (or any other non-ringing or intercept signal, e.g., re-order, disconnected number tone, tri-tone, etc.) is detected, an on-line call monitoring and reporting system drops the connection to the busy called party, and a voice response unit plays a message to the caller with the following options: (1) to leave a message for the busy called party; (2) to listen to a voiced play back of the telephone number just called so the caller can write down the number for future unassisted calls; (3) continue calling the requested party every N minutes, where N is determined by the caller or set by default (e.g., set by the service provider); (4) call the requested party again; (5) page the busy called party at another number; or (6) to return to the directory assistance operator for further assistance.

If the caller chooses option (1), the caller can record a voice message, or send an alphanumeric character message. The caller can also choose this option at any time by pressing the "M" (the number six) key or other predetermined key(s).

The directory assistance service will attempt to contact the busy called party at specific durations (e.g., once every half hour) to automatically deliver the calling party's message (i.e., either a recorded voice or an alphanumeric message). After a certain number of unsuccessful attempts (e.g., 10 attempts), the message delivery to the busy party is canceled. The caller also has a "confirmation" option wherein the directory assistance system calls the caller back to confirm successful or failed delivery of the message.

If the calling party chooses option (2), the system provides an automated voicing of the number to the caller. The caller can record this number for future unassisted calls to the called party. The caller can also choose this option at any time by pressing the pound or number "#" key twice or other predetermined key(s).

If the caller chooses option (3), the system will continue calling the busy party at set intervals. The caller can also choose this option at any time by pressing the "C" (number two) key or other predetermined key(s).

If the caller chooses option (4), the system immediately redials the called party. If the line continues to be busy, the caller can repeatedly select this option to continue redialing the called party.

If the caller chooses option (5), the system pages the called party. Like option (1), the caller also has a "confirmation" option wherein the directory assistance system calls the caller back to confirm successful or failed delivery of the page. The caller can choose from a predetermined set of alphanumeric character messages to send with the page. The caller can also choose this option at any time by pressing the "P" (number 7 key) at any time or other predetermined key(s).

If the caller chooses option (5), the caller is returned to the directory assistance operator. If the caller has not responded after a predetermined time-out period, the system preferably defaults to option (5) and automatically returns to an operator. At any time the caller can press the star "*" key to return to an operator. The directory assistance operator can then provide further "live" assistance to the caller.

If a ringing signal for a non-answering party is detected, an on-line call monitoring and reporting system would after a pre-determined interval, mute (i.e., attenuate or remove) the ringing tone for the caller while the actual ringing of the called party continues. A voice response unit plays a message for the caller with the following options: (1) to leave a message for the busy called party; (2) to listen to a voiced play back of the telephone number just called so the caller can write down the number for future unassisted calls; (3) to continue calling the requested party at selected intervals; (4) to page the busy called party; (5) to return to audible ringing for the call; or (6) to return to the directory assistance operator for further assistance;

If the caller chooses option (1)–(4), the same scenarios described above for the "busy signal" take place. If option (5) is chosen, the system continues ringing the called party. The system defaults to one of the options (e.g., option (5)) if the calling party does not make a selection within a predetermined time-out period.

The ability to leave a message or page that is automatically delivered to a busy, or non-answering party provides a number of benefits to the caller, the busy and/or non-answering party, and the directory assistance service. The caller does not have to record the called party's phone number, or initiate a second call to the directory assistance service at a later time to try and contact the desired party whose number is not initially known. The caller can also receive confirmation of successful or failed delivery of the message or page, relieving the caller of the burden of checking as to whether or not the recorded message actually did get delivered. Thus, interruptions to the caller's activities are kept to a minimum, which is important when the caller is using a mobile telephone or PCS device. Minimal interruptions are also important to land line callers.

A caller can also leave a message for a busy party, and/or a non-answering party without an answering machine, neither of which is normally possible. In addition, a message or page can be left with a non-answering party who is using another telephone service feature (e.g., call waiting) which would normally prevent a caller from making a connection and leaving a message, even if the non-answering party had an answering machine.

The called party will receive messages that could normally not have been delivered. Thus, the called party is less likely to miss an important message. The directory assistance service also benefits since directory assistance operators can spend more time speaking to and connecting new callers, instead of continuously interacting with a caller who is experiencing a busy signal, or a non-answering party.

In another embodiment of the present invention, a caller can provide input choices by speaking the name of the input buttons that are normally pushed. For example, if the caller was asked "to press or speak one" for a response, the caller could speak the word "one," thereby choosing response number one. Therefore, a caller who encounters a busy (or other intercept signal, e.g., reorder, disconnected number, etc.) or non-answering party for example, can leave a recorded message for the party without any additional keypad input after dialing the directory assistance service. Speaking the responses to menu questions offers a substantial benefit over directory assistance services which require telephone keypad inputs. Mobile telephone customers who may be engaged in other activities (e.g., driving a vehicle) that make it inconvenient to continually press keys on the telephone keypad, can simply speak responses to menu items.

The foregoing and additional features and advantages of the present invention will be more readily apparent from the following detailed description, which proceeds with reference to the accompanying drawings.

DETAILED DESCRIPTION

Overview of System

Figure 1:
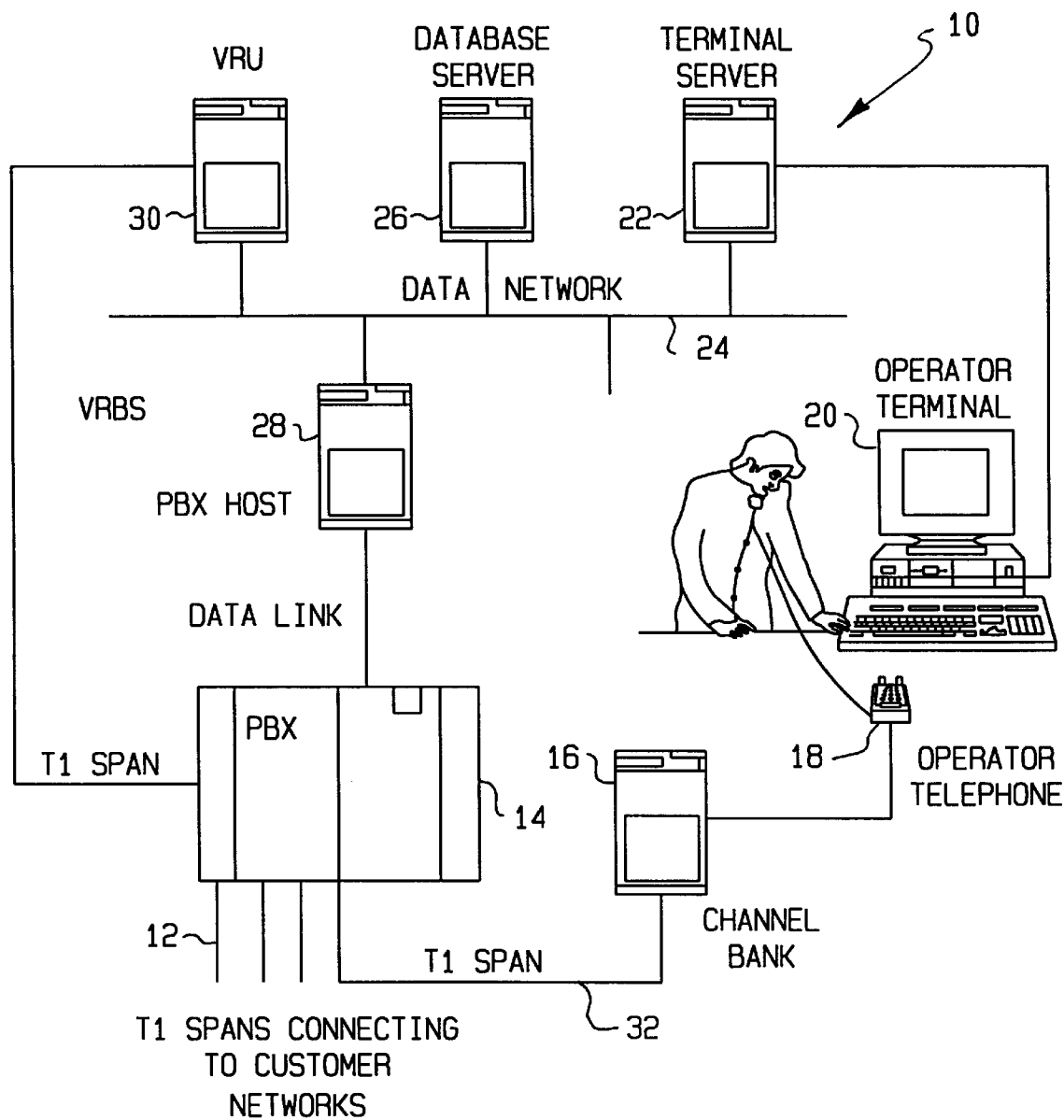
FIG. 1 is a block diagram depicting the hardware used to implement one embodiment of the present invention.

With reference to FIG. 1, a directory assistance center 10 according to a preferred embodiment of the present invention includes one or more T1 links 12 for connection to customer networks, a private branch exchange (PBX) 14, and a channel bank 16 for coupling to a plurality of operator telephones 18. Each operator is further equipped with a terminal 20 that includes a video display unit and a QWERTY keyboard with associated dialing pad. The operator terminals are coupled to a terminal server 22, which in turn is connected over a data network 24 to a database server 26. The data network further connects to a PBX host computer 28 and a voice response unit (VRU) 30. The data network consists of, but is not limited to, a Local Area Network (LAN) supplemented by a number of point-to-point serial data links.

The T1 links 12 provide connection between the directory assistance center 10 and the cellular carrier's switching center, through which incoming directory assistance calls are received. The T1 links 12 further provide connection to the network over which outgoing calls are placed (which network may be different than that used for incoming traffic).

The PBX 14 is conventional, and its operation is governed by instructions stored in the PBX host computer 28. These instructions simply implement the processes hereafter described. In the preferred embodiment, the PBX supports digital T1 telephone circuits, while in other embodiments other PBXs can of course be used. Included in the PBX is digital signal processing circuitry which provides the requisite conference capability (described below), and dual tone multi frequency (DTMF), and multi frequency (MF) tone generation/detection capabilities and complete call progress analysis (detection and reporting).

Incoming calls received by the PBX 14 are connected to an available operator via a T1 circuit 32 that is connected through the channel bank 16 to an operator's telephone headset 18. The operator headset can be that of a standard telephone (e.g., shown in FIG. 1), a headset which is attached to the operator's head and allows "hands free" operation (not shown in FIG. 1), or any other variety of headsets known in art. If no operator is available when a call is received, the call is queued until an operator becomes available. The queuing and call distribution is standard Automatic Call Distribution (ACD).

The terminal server 22 simply serves as an interface between serial devices, such as the operator terminals 20, and the data network 24, allowing the terminals to log in as devices on the network.

The database server 26 provides operators with the means to search for a customer's desired party, and determine the appropriate telephone number. In the preferred embodiment, the database provides the capability to search not just by name and address, but also by type of goods/services and/or geographical region. (E.g., the preferred database can answer queries soliciting the names/numbers of shops carrying model rocketry supplies in southeast Portland, Oreg., or of Chinese restaurants on a given street.) Data indexed in this fashion is usually not commercially available, so the present assignee starts with a commercially available database file (e.g., the Directory Assistance Database Source available from U.S. West), and enriches it by adding further data manually.

Desirably, the results of the database search presented on the operator's terminal 20 are not alphabetized prior to display, but rather are presented in the order located by the database search engine. (If desired, a deliberate randomization of order could be effected before display. Businesses at the beginning of the alphabet are thereby not unduly favored by customers using the directory assistance service.)

The database software itself is conventional. The presently preferred best mode is to use a relational database, such as is available from Oracle. However, much simpler software can alternatively be used, such as DBase 4.

The voice response unit (VRU) 30 is incorporated into the system to play the constantly repeated parts of an operator's speech, namely the various greetings and closings. Not only does this system provide a voice-saving and monotony-relief function for the operators, it performs a 'branding' function (i.e. the pre-recorded messages incorporate the name of the telephone company through which the customer was routed to the directory assistance service), and it also reduces the amount of time an operator is actually connected to a customer.

The VRU 30 is connected via the data link 24 to the PBX host 28 and, via one or more T1 spans 32, to the PBX 14 itself. More than one VRU can exist in a system. At appropriate stages in a call progression, the PBX host 28 initiates a voice path connection between the VRU and the PBX such that the caller, or the caller and the operator, are able to hear whatever pre-recorded speech is played on that circuit by the VRU 30. It then instructs the VRU, via the data network, what type of message to play, passing data parameters that enable the VRU to locate the message appropriate to the call state, the service-providing telephone company, and the operator. The recording density used is high enough to provide a sufficient quality of message playback that most users of the system should be unaware they are listening to a recording.

The PBX 14 detects ringing and busy signals on outgoing lines from the PBX host 28 using its complete call progress analysis capability. The voice recording and playback capabilities of the VRU 30 are utilized as described below to provide a caller the option to leave a recorded message for a busy or non-answering called party. The VRU's voice record and playback capabilities along with the PBX's dialing capabilities also are utilized to try and contact a busy or non-answering party at a later time and deliver messages and/or pages requested by a customer as described below. Preferably, the caller's phone number is reported to the PBX 14 in a conventional manner as a string of data sometimes referred to as the announced number identification (ANI). The PBX 14 also utilizes a string of data sometimes referred to as the dialed number identification string (DNIS) as is conventionally known for identifying a number dialed by the caller (i.e., to the center 10) possibly with translation.

Method of Operation

Customers of a particular telephone company simply dial the access digits established for directory assistance by that company. Examples of typical access digits are "*555" and "555-1212" and "411".

The participating telephone company's own switching system will then reroute the call to the directory assistance service center 10 (via a T1 channel), where it appears as an incoming call.

Automatic Call Distribution (ACD) logic is used to queue incoming calls in an incoming call queue, (if necessary) and distribute calls to operators in the order in which they are received, and such that the call traffic is distributed evenly among the operators.

When a call is connected to an operator, the VRU 30 (also conferenced into the call) plays a greeting message, using a message pre-recorded by the connected operator. Both the operator and the calling customer hear the message, which incorporates the name of the service or company to which the customer is a subscriber (in other words, the call is "branded"). The message ends with a prompt, thus cuing the customer to volunteer what information they are seeking.

When the automated greeting is complete, the VRU is disconnected, and the operator and the customer are left connected by a 2-way speech path. From this point, the caller is interacting with a live operator.

In the event the VRU is non-functional (for whatever reason), the incoming call is connected to the operator and a short "trill," or "zip" tone is played to indicate that a caller is on the line. (Note that once operators are logged in to the system, they wear headsets, and have their telephones 18 permanently off-hook. Their telephones do not ring when a call is presented.) The operator then speaks a greeting and prompt in real time, instead of the VRU playing a message.

If the caller requests information concerning, for example, local theater performances, the operator speaks a response to the request. After the query is answered, the caller is released from the call, and the operator becomes available to handle further calls.

If the caller is seeking directory assistance, the operator engages in live dialogue to establish the name and other pertinent information of the wanted party, and then initiate a database search using the operator terminal 20 and associated database server 26. In the event of an unsuccessful search, the operator will use alternative sources, such as the Electronic White Pages (EWP) or even printed directories.

The operator can connect the caller to the wanted party's number using one of several possible methods of call transfer, which include primarily Blind Transfer (also known as "connect") and Hotline Transfer (also known as "conference connect") described below, and also several sub-options to these call transfer methods. Alternatively, at the caller's option, the operator or VRU 30 can simply voice the number to the caller.

In either case, the call transfer is invoked by sending a sequence of digits (that includes the wanted party's number) to the PBX host 28. The conventional method of doing this is simply dialing the digits on the operator's telephone handset (having first depressed the "flash" key to obtain dial tone). This method is always available. A much quicker and more accurate call completion method is generally preferred: the operator highlights the desired database entry on the screen of the terminal 20, and then initiates Blind or Hotline transfer to that number by entering a few keystrokes on the terminal keyboard. In this case, the database server 26 transmits the same digit sequence as part of a message to the PBX host 28, via the network 24.

Automated Call Completion Method

More specifically, in the preferred automated call completion method, the operator locates the desired listing in the database, and presses the "enter" key at the operator terminal 20 to select the listing. Whereupon, the operator terminal 20 displays a main call completion menu along with a selected listing. One example of such a menu is as follows:

Main Call Completion Menu

1) Connect with Transfer back
2) Connect with NO Transfer back
3) Conference connect with Transfer back
4) Conference connect with NO Transfer back
5) Provide number before connection
6) Supervisor
7) Manual Dial
8) No connect Options (1) and (2) of the main call completion menu initiate the "Blind Transfer" to the selected listing as described more fully below. Options (3) and (4) initiate the "Hotline Transfer" described more fully below. Option (5) initiates an automated (e.g., synthesized or recorded) voicing of the wanted number to the calling party by the VRU 30. Option (6) is selected by the operator to summon the operator's supervisor for assistance handling the call. Option (7) overrides automated dialing of the selected listing, and allows the operator to manually dial a number at the operator terminal 20. Option (8) cancels call completion.

When the operator selects option (7), the operator terminal 20 displays a call completion sub-menu such as follows:

Manual Dial Call Completion Sub-Menu

Enter telephone number __

1) Connect with Transfer back
2) Connect with NO Transfer back
3) Conference connect with Transfer back
4) Conference connect with NO Transfer back
5) Provide number before connection
6) Supervisor
7) Change Number
8) No connect Upon selection of any of the connection options (1)–(4) of either the main call completion menu or manual dial call completion submenu, the database server 26 sends a data packet to the PBX host 28, via the network 24. The data packet contains the appropriate station ID and the digit sequence of the selected listing or manually entered telephone number in the case of option (7). The PBX host 28 creates a conference bridge with the caller and the called party, then either completes the "Blind Transfer" in the case of options (1) or (2) or continues with the "Hotline Transfer" in the case of options (3) or (4). In the case of options (1) or (3), the tone triggered return transfer operation which is described more fully below is enabled during the call. In the case of options (2) or (4), the tone triggered return transfer or transfer back operation is disabled as also discussed more fully below.

Blind Transfer Connection

"Blind Transfer" is the normal means by which an operator establishes a connection between the caller and the wanted party's number. As soon as the PBX host 28 receives the Blind Transfer command (whether from the database server 26 or the operator's telephone set 18), an attempt is made to establish a route out of the PBX 14. If successful, the circuit is seized and the address digits propagated, using the protocol the circuit is configured for: the operator is released from the call and made available to receive further calls. If the VRU 30 is operational, it is commanded to play a closing message (pre-recorded by the just-released operator). If the VRU is not available, the operator speaks the closing message before initiating the transfer. Optionally, the outgoing call set-up can be initiated sometime before the closing message completes (e.g., at a time equal to the average or expected time of call set-up prior to the completion of the closing message). The VRU status is known by whether the call was initiated by a VRU-played greeting, or by zip tone. Failed routing attempts cause reorder tones to be returned to the operator's handset, or an error indication to be returned to the database server 26 (depending on how the PBX host received the transfer command).

Hot Line Transfer Connection

Like Blind Transfer, the "Hotline Transfer" method of establishing a connection between the caller and the wanted party's number can be initiated by the operator from either the telephone handset 18 or from the data terminal keyboard 20. The difference is that the operator is not automatically released from the call in a Hotline Transfer. Instead, he/she is conferenced into the call by the PBX 28 and is able to monitor its progress. Using either the telephone handset or the data terminal keyboard, the operator may withdraw from the call after verifying its establishment, or may cause the called circuit to be released and then re-engage in dialogue with the caller. Hotline Transfers are used when a caller requests that the operator "stay on the line."

Tone-Triggered Return Transfer

If, after initiation of a transfer (whether or not it succeeds), and at any time before the caller hangs up, the caller requires further operator assistance, the caller can perform a tone signal triggered, return transfer back to an operator (hereinafter referred to as "tone triggered return transfer" or "transfer back"). This is done simply by pressing the "*" (star) key or another designated key on the caller's telephone once or twice (depending on the network, and as instructed by the operator in the closing message).

The star or other designated key tone(s) is detected by a DTMF receiver (allocated in the PBX 14 for the entire duration of the call), and causes the caller to appear as a fresh call to the ACD logic. Detection of the DTMF tone results in the caller being placed in a priority queue, from which the caller is connected to an available operator. Whereupon the PBX host 28 instructs the connected VRU 30 to play the appropriate pre-recorded return greeting. Note that the call is allocated to an operator according to the ACD algorithm, and may or may not be the same operator that previously handled this call.

The priority queue is different from the incoming call queue in which the caller was initially placed. The ACD algorithm allocates calls to operators out of the priority queue first. The priority queue is processed until it reaches some predetermined level (e.g., the priority queue is empty). When an operator becomes available and the priority queue has reached the predetermined level, then new incoming calls are assigned to the operator from the incoming call queue. This gives precedence to calls already in progress (as compared to newly initiated calls to the directory assistance service).

The "tone triggered return transfer" feature enables callers who have been transferred to recall an operator if the transfer does not complete satisfactorily (for example, receipt of reorder tone, busy tone, operator intercept tri-tones, ring-no-answer, silence, or wrong number). It also enables a caller to request a follow-on call at the completion of a successfully completed call without incurring the delay or difficulty of re-dialing into the system.

It will be recognized that, in the preferred embodiment, the desired number is not voiced to the customer unless explicitly requested. Sometimes a customer uses the "tone triggered return transfer" feature to request that the number be voiced if, for example, he or she finds a follow-up call is necessary later.

Process for Non-Answering Party Connection Options

A flow diagram illustrating the sequence of events in a directory assistance system with connection options for a non-answering party according to the preferred embodiment of the invention is shown in the flowchart in FIGS. 2A–2E.

When a call is received by the directory assistance center 10 as a result of a caller dialing the access code for the directory assistance service (step 38 of FIG. 2A), the call is either assigned immediately to an operator if any operator is available, or the PBX 14 queues the caller's call in the incoming call queue and eventually assigns the call to an operator as operators become available as described above (step 40 of FIG. 2A). When the caller is connected, the VRU 30 plays the normal directory assistance greeting (step 42 of FIG. 2A), and the caller and the directory assistance operator speak (step 44 of FIG. 2A). The operator 40 locates the number of the party desired by the caller and transfers the call (step 46 of FIG. 2A) as described above. The VRU plays a closing message and the caller is connected to an outgoing circuit to connect to the desired party (step 48 of FIG. 2A). At any time the caller can press the star "*" key to talk again to a live directory assistance operator (step 50 of FIG. 2A). The PBX uses a plurality of dedicated Digital Signal Processors (DSPs) to continuously monitor each of the lines connected to the PBX. Each DSP is assigned one or more lines to monitor continuously.

If the destination number rings for a predetermined duration (e.g., 6 rings or a predetermined time period (e.g., 40 secs.) without answering) after a call is transferred by the directory assistance operator to a destination number (step 52 of FIG. 2B), the ringing tone is muted (step 54 of FIG. 2B) for the calling party by the PBX 14. The ringing signal actually continues on the circuit to the called party, however, the audible ringing tone is no longer sent to the caller.

Figure 2A:
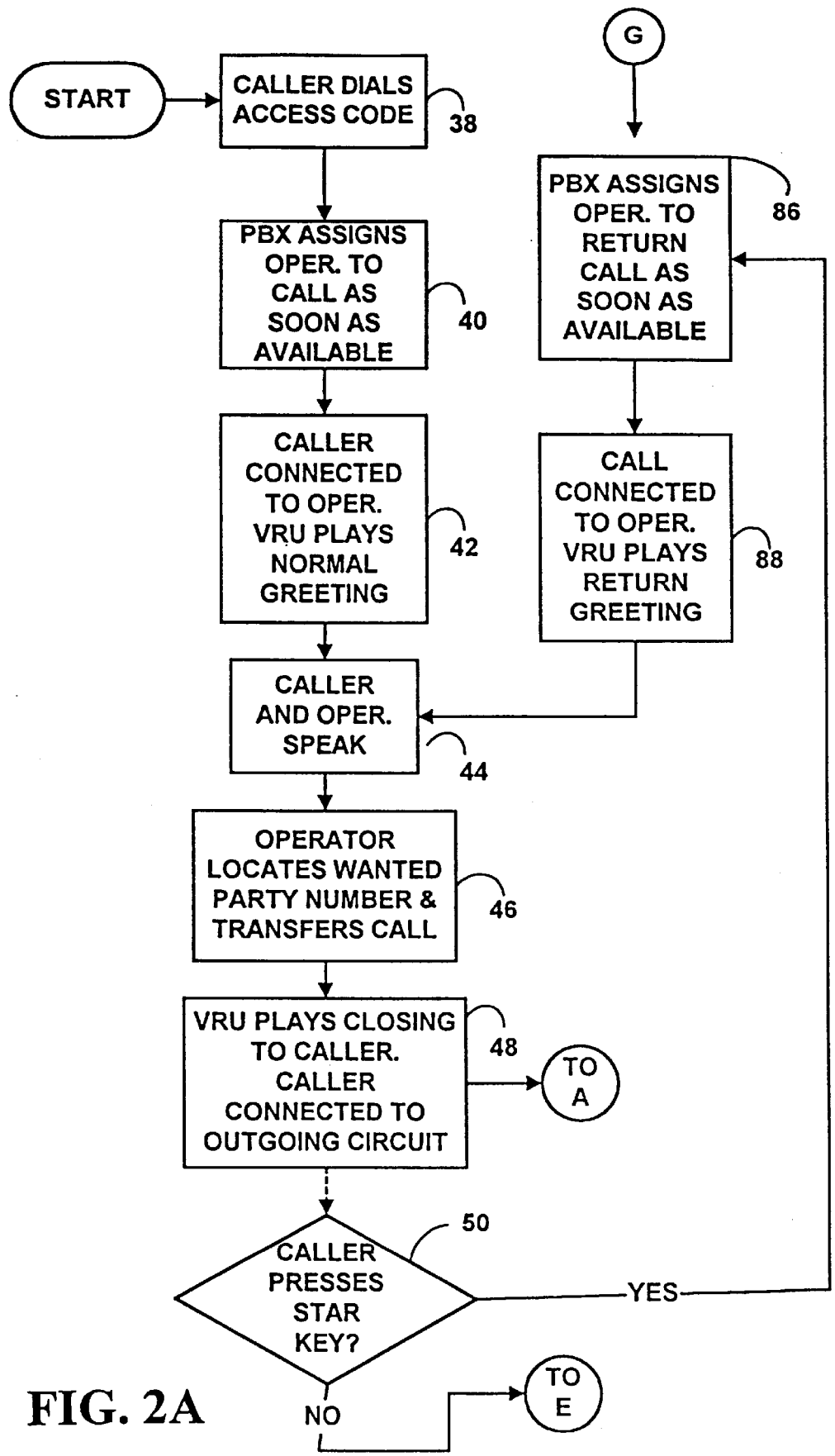
FIGS. 2A–2E is a flow chart depicting the process by which directory assistance messages for non-answering parties are provided to a customer in accordance with the FIG. 1 embodiment.
Figure 2B:
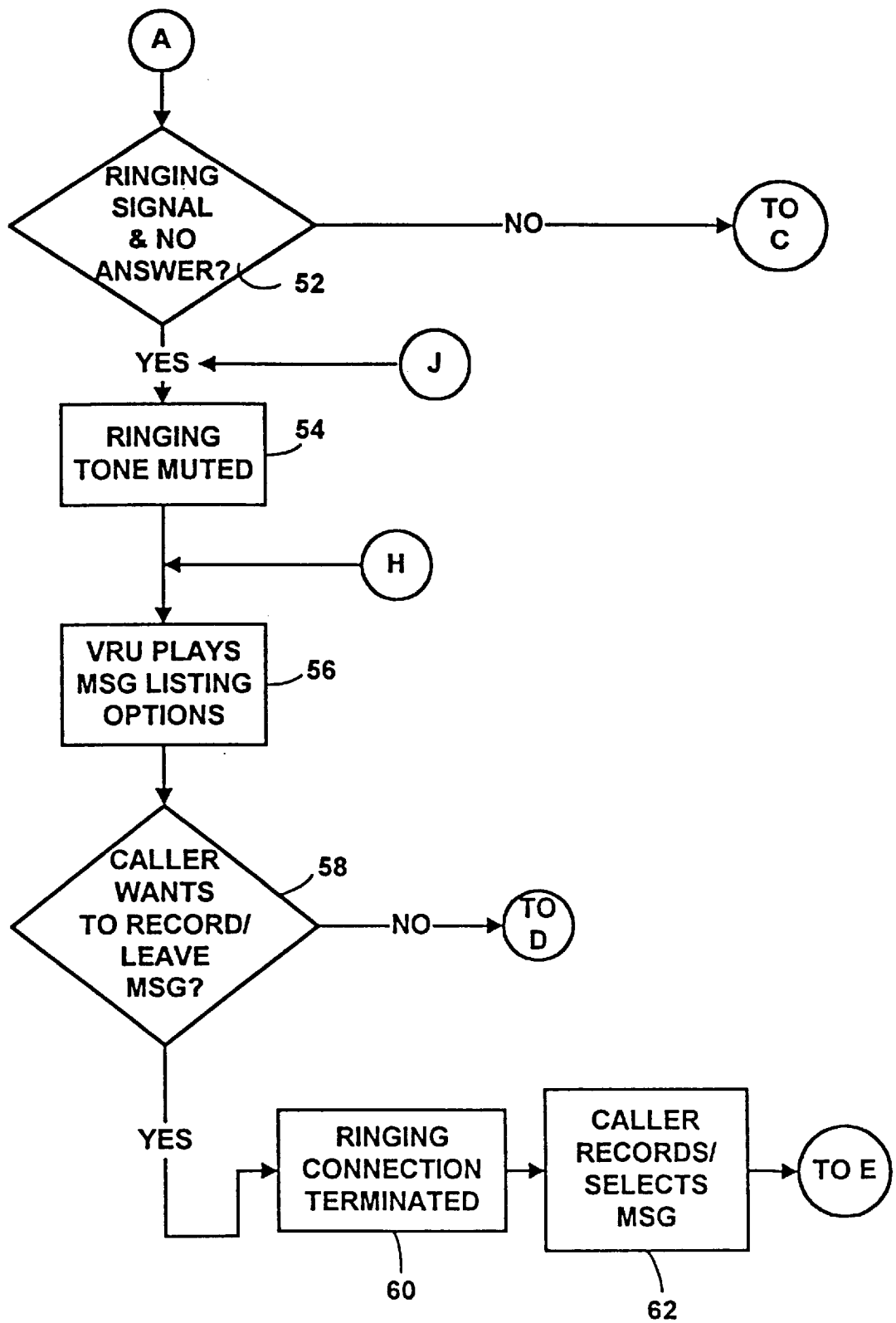

After muting the audible ringing tone for the caller, the PBX 14 instructs the VRU 30 to play a message to the caller providing available options for the caller (step 56 of FIG. 2B). For example, in the preferred embodiment of the present invention, the following options are included for the caller by the voice playback unit for a non-answering called party:

Non-Answering Called Party Initial Main Menu

1. If you would like to leave a message for this non-answering party, please press (or speak) one now.
2. If you would like to receive the number of this non-answering party, please press (or speak) two now.
3. If you would like to call this non-answering party every N minutes, please press (or speak) three now.
4. To page this non-answering party, please press (or speak) four now.
5. To continue holding for an answer, please press (or speak) five now, and stay on the line. Audible ringing will be returned to your call.
6. To hang up, please press (or speak) six now, or hang up your receiver.
7. To return to an operator for further assistance, please press star at any time.

However, more or fewer options could be included in this menu. Further, the menu can be arranged as a multi-level menu tree, with menus of additional sub-options accessed by selecting a main option from the initial main menu. In another embodiment of the present invention, the following options are included in the initial main menu for the caller by the VRU 30 for a non-answering called party:

Non-Answering Called Party Alternative Main Menu

1. If you would like to leave a message for this non-answering party, press the "M" key at any time.
2. If you would like to receive the number of the non-answering party, press the pound key twice at any time.
3. If you would like to call the non-answering party every N minutes, press the "C" key at any time.
4. To page the non-answering party, press the "P" key at any time.
5. To continue holding for an answer, stay on the line. Audible ringing will be returned to your call.
6. To hang up, hang up your receiver.
7. To return to an operator for further assistance, please press star at any time.

Message Option (1)

If a caller chooses option (1) by pressing the one key on the telephone, or by pressing the "M" (six key) at any time if the alternate initial main menu is used 58, the VRU 30 plays a submenu which asks the caller if they wish to leave a recorded message, an alphanumeric message typed by a directory assistance operator, or an alphanumeric message from a predetermined set of alphanumeric messages for the called party.

If the caller wishes to leave a recorded voice message for the non-answering party, the VRU 30 plays another submenu which includes notifying the caller that additional fees will be charged. The caller is given an option of accepting this service by pressing the one key (i.e., "yes"), or declining this service by pressing the two key. Other keys for yes and no could also be used (e.g., nine key for yes, and six key for no, etc.). If the two (i.e. "no") key is pressed, the next appropriate submenu (e.g., to choose a pre-determined alphanumeric message). is played for the caller by the VRU 30. If the caller desires to leave a message (i.e., a recorded voice message or a pre-determined alphanumeric message) and agrees to accept the charges for message delivery, the VRU 30 terminates the connection to the ringing non-answering called party (step 60 of FIG. 2B), and queries the caller for message information (step 62 of FIG. 2B). For example, in the preferred embodiment of the present invention, the query information to leave a recorded message would include:

Recorded Message Queries (a) Please leave a message for __
(b) This message is from __
(c) The message to be delivered to "response from (a)" from "response from (b)" is __
(d) Do you want to configure the time interval and number of attempts to contact "response from (a)"? Press (or speak) one for yes, or two for no.
(e) Do you want the system to call you back and confirm successful or failed delivery of this message? Press (or speak) one for yes, or two for no.

As indicated, the caller also has the option of configuring the time interval and number of attempts used to contact the non-answering party to deliver the recorded message. If the caller does not want to configure call back parameters, default call back parameters are used (e.g., at time intervals set to every half-hour, and number of attempts set to ten).

If the caller chooses option (e) after recording a message, the VRU 30 and PBX 14 automatically contact the caller at a later time to confirm the recorded message was delivered, or the message delivery failed. If this option is chosen, the VRU 30 records the caller's phone number to allow the directory assistance center to contact the caller at a later time.

The VRU 30 will attempt to contact the non-answering party at specific durations (e.g., once every half hour) to automatically deliver the calling party's message. Preferably, the VRU 30 utilizes the Message Delivery With Called Party Type Detection described more fully below. For managing the message delivery attempts, the VRU 30 records a message delivery status and a count of failed delivery attempts. When a message delivery attempt succeeds, the message delivery status is set to success. If a message delivery attempt is unsuccessful, or the call is answered, but the called party is not available, the message delivery status is set to failure and the count of failed delivery attempts is incremented. When the mail delivery status is set to success, or the count of failed delivery attempts reaches the number of attempts set by the caller or by default, the recorded message delivery is canceled. The message delivery status (i.e., success or failure) is reported to the caller when the VRU 30 and the PBX 14 calls the caller back (if the call back and confirm option is set by the caller or by default).

The caller can also leave an alphanumeric message (step 62 of FIG. 2B) for a non-answering party by choosing option (1) from the Non-answering Party Main Menu (described above) and a suboption for alphanumeric messages under a submenu for option one. One sub-option allows the caller to dictate an alphanumeric message which will be typed by a directory assistance operator. The caller is returned to an operator to dictate the message if this sub-option is chosen. A second suboption allows the caller to choose an alphanumeric message from a set of predetermined alpha numeric messages.

A dictated or pre-determined alphanumeric message is used when the number for the non-answering party is for a Personal Communications Service (PCS) device, FAX, or other device which can receive and display alphanumeric text.

For example, in the preferred embodiment of the present invention, the predetermined set of alphanumeric messages includes:

Predetermined Alpha numeric message queries

The following alphanumeric message are available. Please choose an alphanumeric message query by pressing the appropriate key:

1. Please call me back at __ (caller inputs phone number).
2. Please call home.
3. Please call the office.
4. Please call me back after __ (caller inputs time).
5. Please call me back on __ (caller inputs date).

However, more or fewer options could be included in the alphanumeric message query submenu. As can be seen from the alphanumeric message query submenu, there are multiple pre-determined alphanumeric messages (2,3), and multiple messages which require numeric input from a caller (1,4,5) (e.g., require a telephone number). If the caller chooses an alphanumeric submenu item which requires numeric input, the numeric input is completed by pressing the appropriate keys on the telephonic device. The dictated or predetermined alphanumeric message is delivered in the same manner as was described above for the recorded voice message. The success or failure of an alphanumeric message delivery can also be verified by a call back to the caller at the caller's option as was described above.

Called Number Play Back Option (2)

Figure 2C:
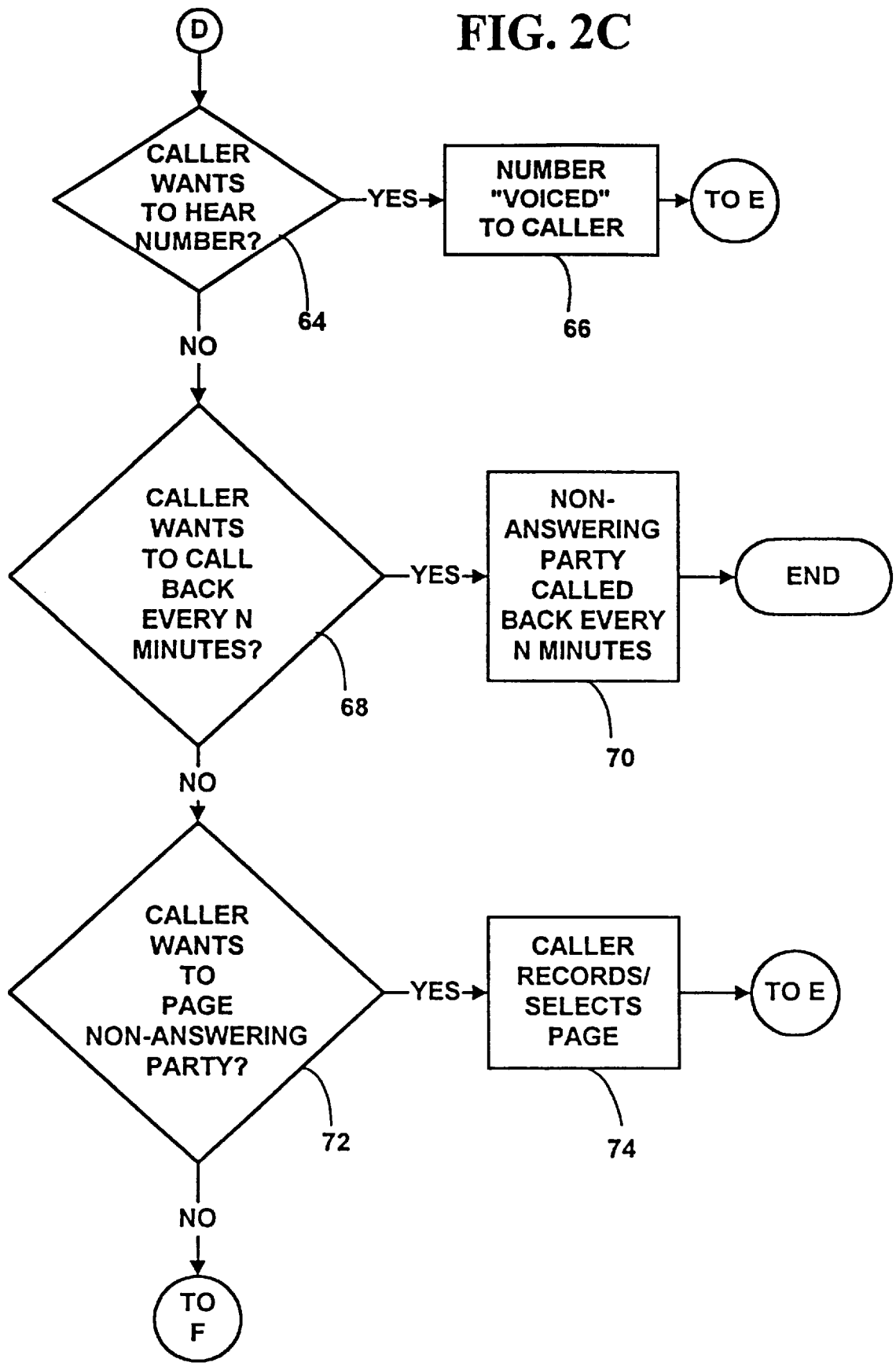

If the caller chooses option 2 from the non-answering called party menu above, or presses the pound or number "#" key twice if the alternate initial menu is used (step 64 of FIG. 2C), the VRU 30 will play a submenu for option 2 which includes voicing the number of the non-answering party to the caller (step 66 of FIG. 2C). The caller can then record the number to call the non-answering party at a later time without further directory assistance. The submenu for option 2 may also contain more or fewer options.

Connect At N Minute Interval Option (3)

If the caller chooses option 3 from the non-answering called party menu described above, or presses "C" (two key) if the alternative initial menu is used (step 68 of FIG. 2C), the VRU 30 will play a submenu for option 3 which includes having the directory assistance service connect back to the non-answering party every N minutes (step 70 of FIG. 2C), where N is preferably determined by the caller. The submenu preferably has the following form:

Connect Every N Minutes Submenu (a) The connect interval (i.e., N) is __
(b) This message is from __
(c) The time limit for connect every N minutes is __
(d) The phone number for calling back is __
You may now hang up, or press the star key to return to an operator.

In an alternative embodiment of the present invention, the connect interval N is not configurable by a caller, and a default connect interval N is set by the service provider. The submenu for option 3 may also contain more or fewer options. After the caller has set the options for connecting every N minutes, the caller can hang up or press the star key to have the operator place another call.

In the preferred embodiment, the directory assistance center 10 attempts to connect to the called party at the connect interval set by the caller or by default. If there is still no answer in the time limit set by the caller or by default, the directory assistance center 10 connects back to the caller and the VRU 30 reports failure to connect to the called party.

If the called (non-answering) party answers on any of the directory assistance center's attempts to connect within the time limit, the VRU 30 plays the recorded message as follows:

> Hello, this is <service provider name>, you have a call from <name of caller>, please stay on the line while we connect you to <name of caller> where <service provider name> is the name of the directory assistance service or the name of the telephone service provider of the caller, and <name of caller> is the name input by the caller in response to the Connect Every N Minutes Submenu above. The directory assistance center 10 will then attempt to connect the called party back to the caller.

If the caller does not answer the call back within a predetermined period or a busy signal or other intercept signal is received, the VRU 30 voices the following to the called party:

> We have been unable to connect you with <name of caller>, however the phone number at which you can reach <name of caller> is <caller's phone number>.

where <name of caller> is the name provided by the caller in response to the Connect Every N Minutes Submenu described above, and <caller's phone number> also is the number provided by the caller in response to the submenu or the ANI data string from the caller's original call to the directory assistance center 10.

In an alternative embodiment, the directory assistance center 10 first connects to the caller before making each attempt to connect to the called party at each connect interval. The directory assistance center 10 is thereby sure to be able to connect the called party to the caller if the called party answers. In either case of the preferred embodiment or the alternative embodiment, the VRU 30 preferably voices an explanation of the operation of the connect every N minutes option when it is selected by the caller.

Page Option (4)

If the caller chooses option 4 from the non-answering called party menu, or presses "P" (seven key) at any time if the alternate initial menu is used (step 72 of FIG. 2C), the VRU 30 will play a submenu for option 4 which includes sending a recorded voice page or a pre-determined alphanumeric text page using a pager number (step 74 of FIG. 2C). The submenu for option 4 may also contain more or fewer options. The recorded voice page and pre-determined alphanumeric text page are selected from submenus, sent and confirmed in a manner similar to that discussed for the recorded voice message and pre-determined alphanumeric message described for option 1 above. The directory assistance service sends the page to a pager, PCS, or other number capable of accepting a page associated with the non-answering party. The caller also has the option of obtaining a pager, PCS, etc., number from a directory assistance operator.

Return to Ringing Option (5)

Figure 2D:
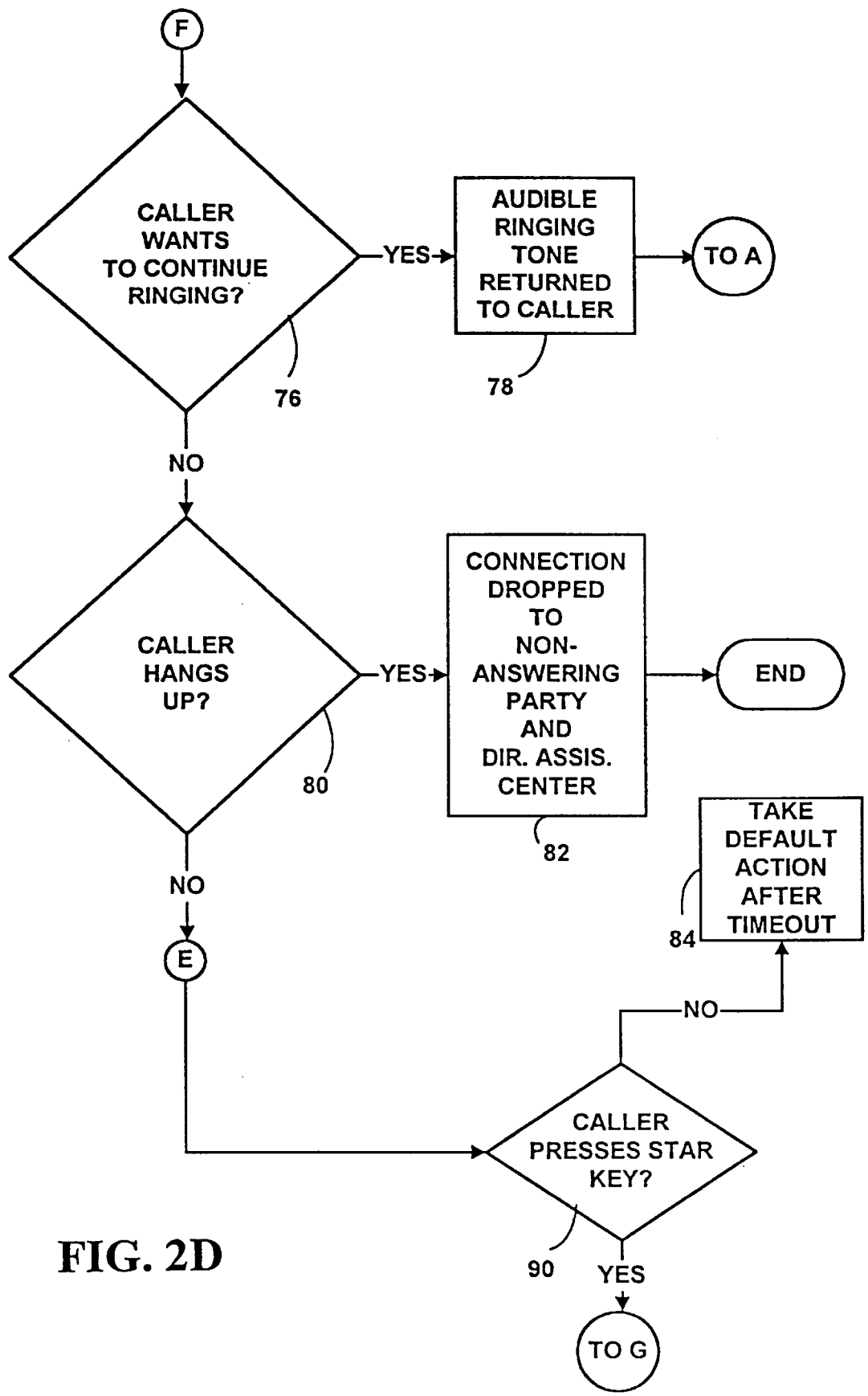
Figure 2E:
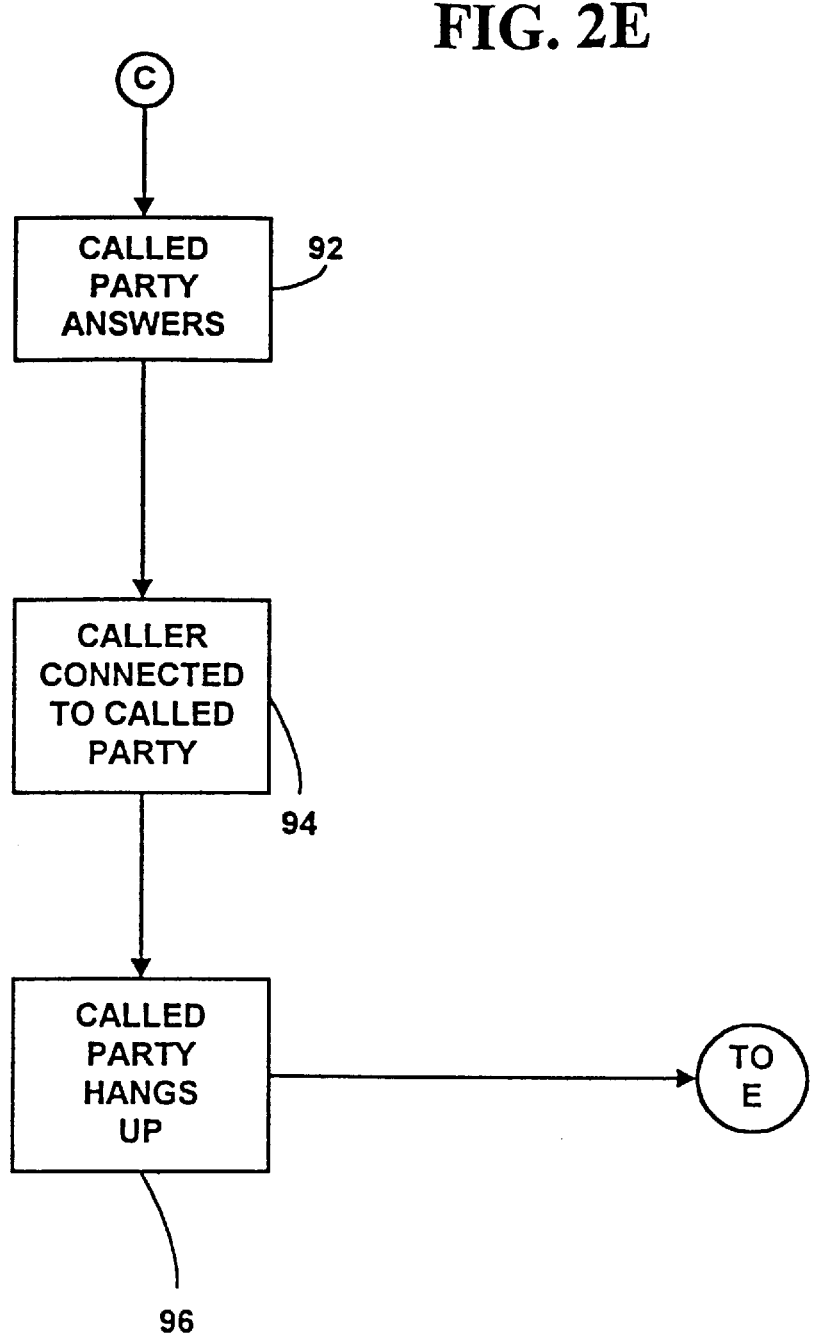
Figure 3A:
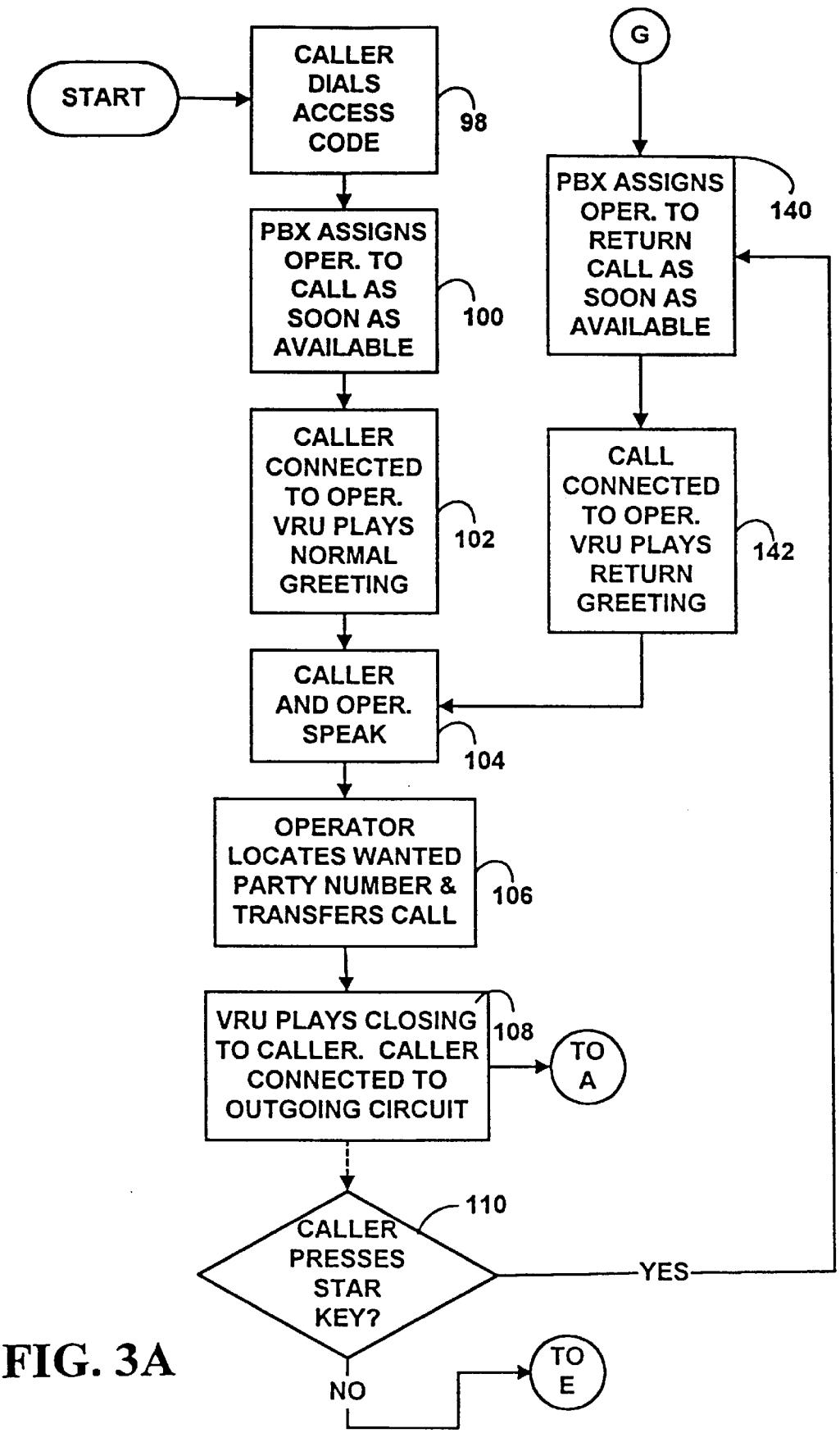
FIGS. 3A–3E is a flow chart depicting the process by which directory assistance messages for busy parties are provided to a customer in accordance with the FIG. 1 embodiment.
Figure 3B:
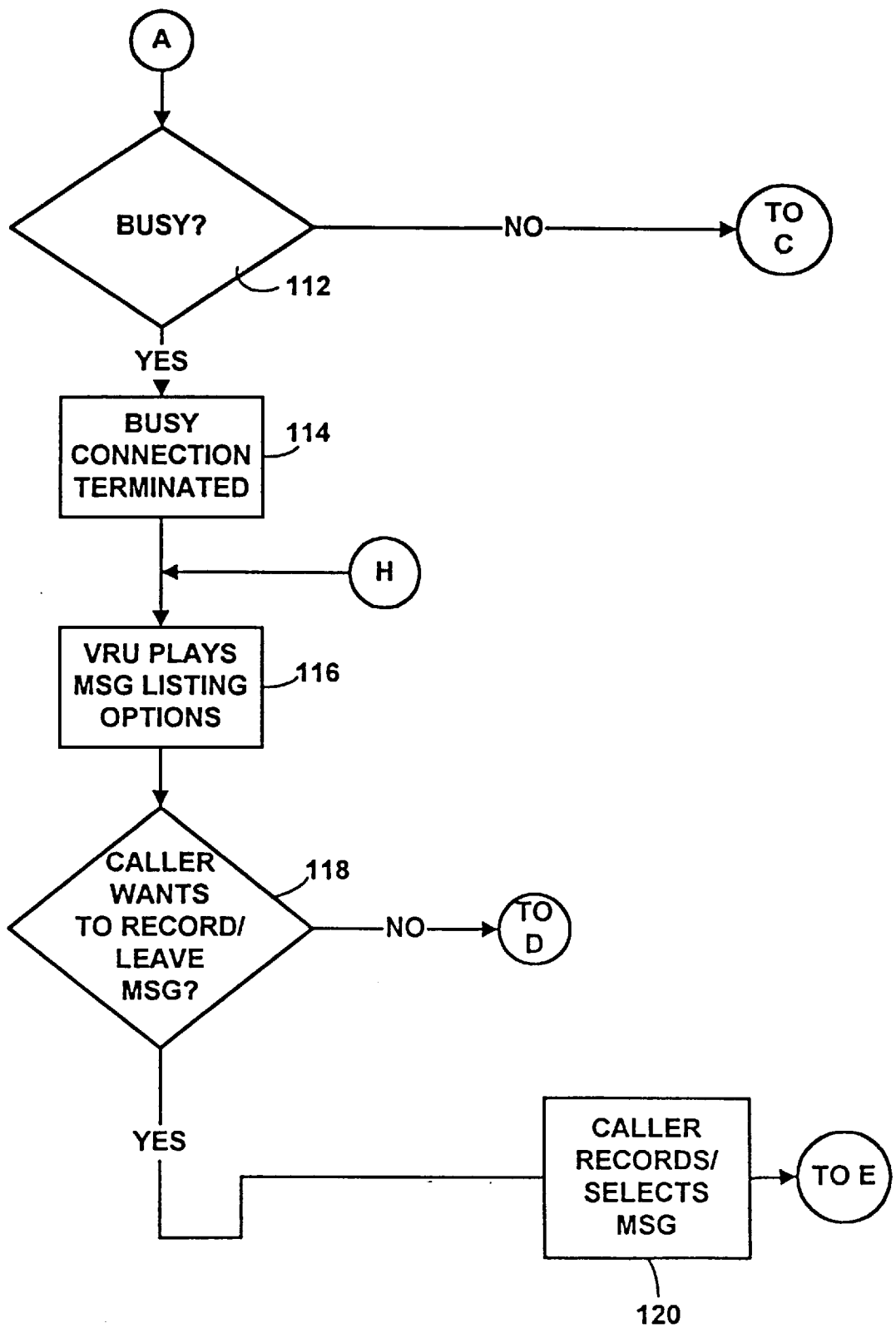
Figure 3C:
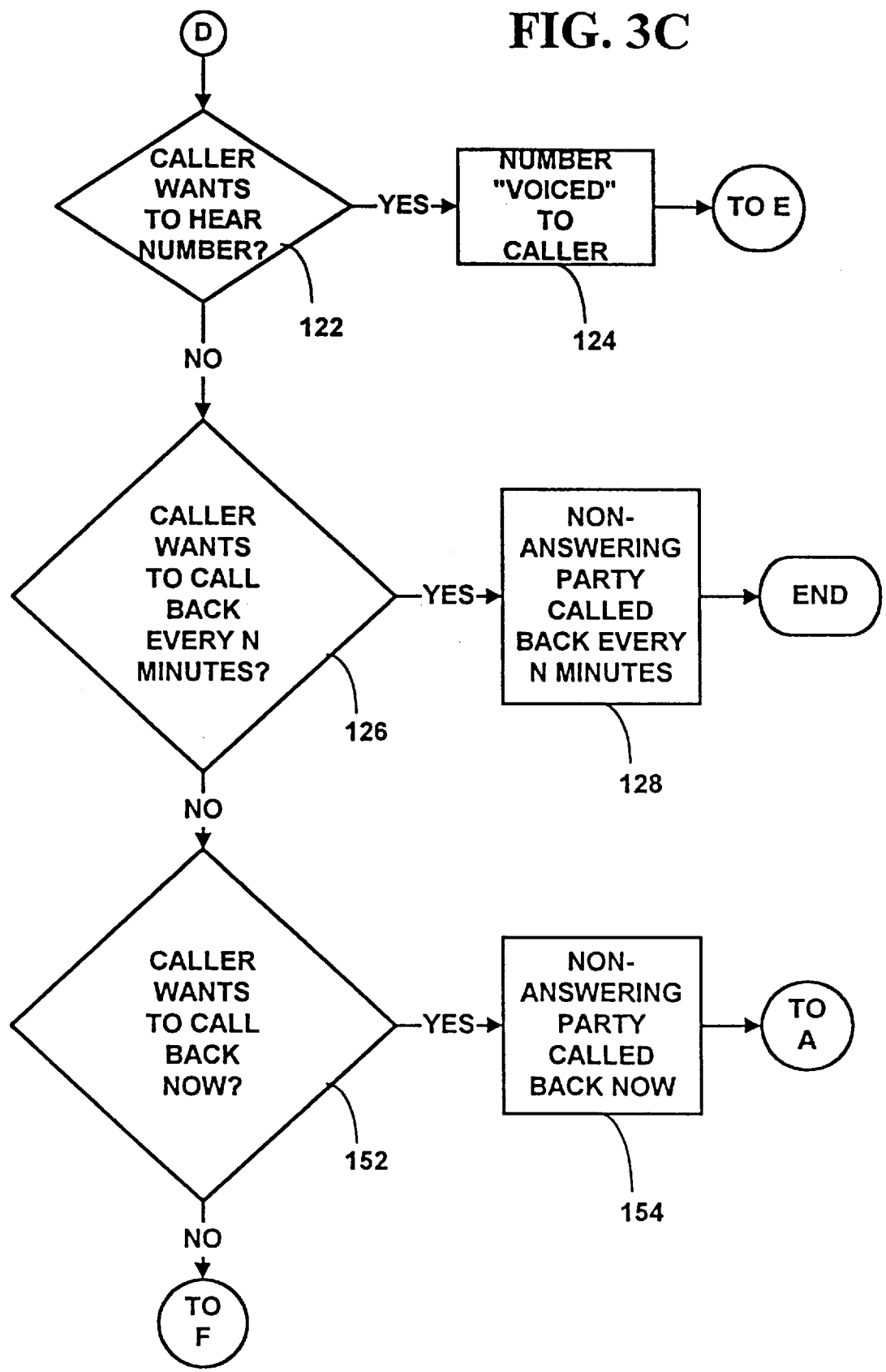
Figure 3D:
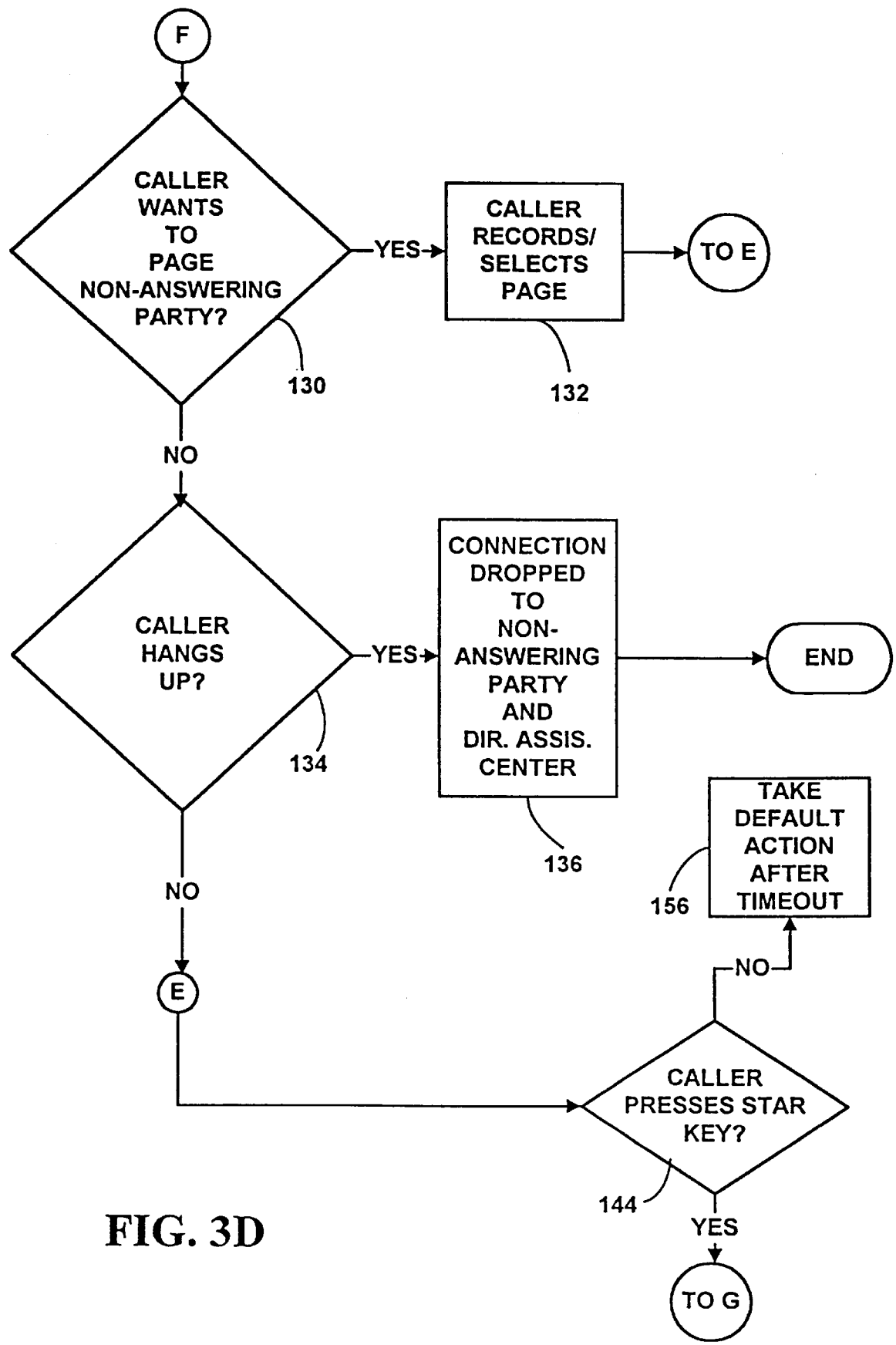
Figure 3E:
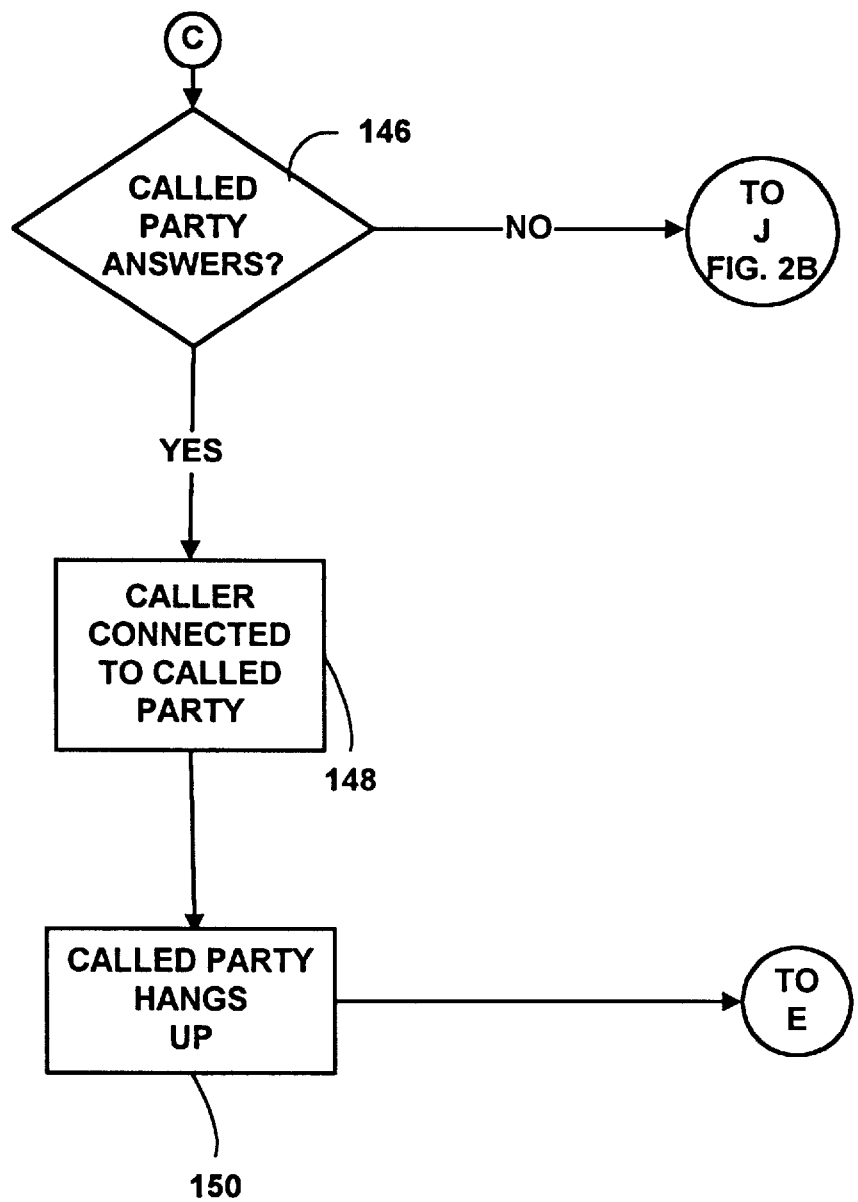

If the caller chooses option 5 from the non-answering called party menu (step 76 of FIG. 2D), the audible ringing is returned to the caller (step 78 of FIG. 2D). If there is still no answer after an additional period of the defined number of rings with no answer (e.g., 6 rings as defined by the directory assistance center) (step 52 of FIG. 2B), the VRU 30 again mutes the audible ringing tone 54 and re-plays the recorded Non-Answering Called Party Menu described above (step 56 of FIG. 2B).

Hang Up Option (6)

The caller can terminate the call by hanging up at any time, or by choosing option (6) and then hanging up (step 80 of FIG. 2D). When the caller hangs up, the connection to the called party and the directory assistance service is dropped (step 82 of FIG. 2D).

Return to Operator Option (7)

If the caller selects option (7) by pressing the star key or seven key as indicated in the menu, the caller is returned by the directory assistance center 10 to a live operator as described above for a tone-triggered return transfer.

Default Action

In the preferred embodiment, the directory assistance center 10 defaults to one of the options if the caller does not make any inputs for a pre-determined time period (e.g., ten seconds). The preferred default option is to return audible ringing to the line for the caller (i.e., option (5) is the default). Alternatively, the default option is to return the caller to a live directory assistance operator (step 86 of FIG. 2A) as if the caller had selected option (7). If the return to operator default is used, the PBX 14 ceases ringing to the called party. The VRU 30 will then play the proper return greeting (step 88 of FIG. 2A), and the caller again speaks with a directory assistance operator (step 44 of FIG. 2A). Also, at any time during or after hearing the Non-Answering Called Party Menu and/or submenu options, the caller can press the star "*" key (step 90 of FIG. 2D) to again talk to a live directory assistance operator.

If the called party answers (step 92 of FIG. 2E) the call at any time during voicing the menu and submenu options, the VRU 30 will stop playing the menu and the connection to the called party will proceed as usual (step 94 of FIG. 2D). The caller and the called party will be connected, and can then engage in a voice conversation. The PBX 14 continues to continuously monitor the connection during the conversation. If the caller presses the star key at any time, the caller is returned to the operator (step 86 of FIG. 2A).

Post Call Termination Activity

After the called party terminates the call (step 96 of FIG. 2E) (i.e., the called party hangs up), the caller can stay on line for further directory assistance options or immediately press the star key "*" (step 50 of FIG. 2A) to again talk to a live directory assistance operator. If the caller stays on the line after call termination, the VRU 30 is connected to the caller and voices the following call termination menu:

> The number of the party you called is <called party's number>. You can press the star key to return to an operator, or press the pound key to repeat this message, or hang up.

where <called party's number> is the number of the called party of the just terminated connection. If the caller presses the star key in response to this menu, the directory assistance center returns the caller to an operator as described above for a tone-triggered return transfer. If the caller presses the pound key, then the VRU 30 again voice the menu (including the number of the called party).

In alternative embodiments, the VRU 30 can play an alternative call termination menu with more or fewer options. For example, playing the number of the called party back to the caller can be an option which must be selected by the caller. The menu also can include a further option to have the directory assistance center disconnect from the caller.

The directory assistance center 10 terminates the connection from the caller only when the caller hangs up (step 80 of FIG. 2D) or affirmatively chooses a menu option for the directory assistance center to disconnect, or the caller does nothing for a predetermined time out period (e.g., 30 seconds).

Sending a Called Number Page

After the completed call has been terminated (e.g., the caller has terminated the call), the directory assistance center 10 in the preferred embodiment sends an alphanumeric page using a paging protocol (e.g., telocator alphanumeric paging protocol (TAP), telocator data protocol (TDP), etc.) to the caller's telephonic device if the caller's telephonic device is capable of accepting such a page. The directory assistance center determines if the caller's telephone is capable of accepting a page by checking attributes of the caller's telephone number in the directory assistance database. The page includes the name for the called party (e.g., Smith, Jane M.) and the telephone number for the called party (e.g., 503-234-5678). If the caller has telephonic equipment capable of accepting paging protocols (e.g., a mobile phone, a PCS device, a pager, etc.) and storing such paging information, the name and number of the called party is then automatically stored in the caller's telephonic device. When the caller later desires to again call the called party, the caller can recall the stored number from his/her telephonic device and attempt to complete the call without help from the directory assistance center.

Process for Busy Party Connection Options

If a busy signal is detected by the PBX 14, a process comprising the steps 98–150 shown in FIGS. 3A–3E is performed. These steps are similar to those just described for a non-answering party. For example, in the preferred embodiment of the present invention, the following options are provided for the caller by the VRU 30 (step 116 of FIG. 3A) for a busy called party:

Busy Signal Called Party Initial Main Menu

1. If you would like to leave a message for this busy party, please press (or speak) one now.
2. If you would like to receive the number of this busy party, please press (or speak) two now.
3. If you would like to call this busy party every N minutes, please press (or speak) three now.
4. To page this busy party, please press (or speak) four now.
5. To call the busy party again, please press (or speak) five now.
6. To hang up, please press (or speak) six now or hang up your receiver.
7. To return to an operator for further assistance, please press star at any time.

Again, more or fewer options could be included in this menu and submenus could be used. In an alternative embodiment of the present invention, the following options are included for the caller by the voice playback unit for a non-answering called party:

Busy Called Party Alternative Main Menu

1. If you would like to leave a message for this busy, press the "M" key at any time.
2. If you would like to receive the number of this busy, press the pound key twice at any time.
3. If you would like to call the busy party every N minutes, press the "C" key at any time.
4. To page the busy party, press the "P" key at any time.
5. To call the busy party again, press the "1" key at any time.
6. To hang up, hang up your receiver.
7. To return to an operator for further assistance, please press star at any time.

The options for a busy party (i.e., steps 98–148 FIGS. 3A and 3B) are similar to those just described for a non-answering party. However, when a busy signal is encountered, the connection to the busy party is dropped since the called party was busy, and not non-answering. As a result, the caller cannot continue ringing the called party's line (e.g., as the caller could by selecting option 5 in the Non-Answering Called Party Menu and description above). Instead, when the caller selects option (5) in the Busy Signal Called Party Menu (step 152 of FIG. 3C), the PBX 14 initiates a new call to the called party (step 154 of FIG. 3C). The caller thus can repeatedly call the called party by selecting option (5) in the Busy Signal Called Party Menu each time a busy signal is received, until the called party's line is no longer busy and a subsequent new call to the called party succeeds in ringing the called party's line.

In the case where the caller takes no action within a predetermined time period (e.g., 10 seconds), the directory assistance center 10 can default to one of the options. The preferred default action is to call the busy called party again (as for option (5)). Alternatively, the default action is to return the caller to a directory assistance operator as for option (7).

Message Delivery With Called Party Type Detection

As was described above, if the caller leaves a message or page for a busy party, the VRU 30 will attempt to deliver the message or page at a later time. At intervals definable by the caller and/or the directory assistance service (e.g., every 30 minutes), the VRU 30 attempts to deliver the message or page by calling the non-answering or busy party.

If during any attempt to deliver a message or page the called party answers, or the called party's answering machine or automated answering service answers, a determination is made if the called party is a "live person" or is an answering machine or automated answering service. The VRU detects whether the answering called party is: (1) a called party with a residential phone or personal communications device capable of voice; (2) a called party with a business phone; or (3) an answering machine or automated answering service (e.g., voice mail, etc.). However, the VRU detection of the called party is not limited to the equipment in this list. The VRU can be configured to detect additional types of called parties.

The VRU examines the energy and duration of the voice response when the call is answered to make a determination of what the answering called party actually is. For example, a called party on a residential phone is typically characterized by a short burst (e.g., <1 second duration) of voice response energy (e.g., by answering "hello . . . "). A called party on a business phone is characterized by a longer burst (e.g., >1 second and <3 seconds of duration) of voice response energy (e.g., by answering, "good afternoon, this is <business name>, can I help you?"). An answering machine or automated answering service is characterized by a long burst (e.g., >3 seconds duration) of voice response energy (e.g., for an answering machine, "hi, this is me, I can't come to the phone right now, if you want to leave a message, please leave your name, number . . . ", for an automated answering service "your call is being answered by service XYZ, the party you are trying to reach is unavailable, please leave a message . . . "). Upon determination of the type of answering called party, the VRU will play the appropriate message or message menu.

When the VRU detects a residential phone or PCS device capable of accepting two-way voice information, the VRU plays a message menu that includes:

This is the directory assistance center, we have a message for <called party's name>, if this is <called party's name> please press one. If this is not <called party's name>, but <called party's name> is nearby, please press two to hold this message for <called party's name>. Press three to continue at any time. If this is not <called party's name>, please press four, and the directory assistance center will try again to contact <called party's name> at a later time.

where <called party's name> is the name of the called party input in response to the message options submenu.

When the VRU detects a business phone, the VRU plays a message menu that includes:

This is the directory assistance center, we have a message for <called party's name>. If you can transfer this call to <called party's name>, please press one, then transfer this call to <called party's name>. Please press two after the call has been transferred to <called party's name>. If this is not <called party's name> but <called party's name> is nearby, please press three to hold this message for <called party's name>. Press four to continue at any time. If <called party's name> is not available or you cannot transfer this call to <called party's name> please press five, and the directory assistance center will try again later to contact <called party's name>.

where <called party's name> is the name of the called party input in response to the message options submenu.

When the VRU 30 detects an answering machine or automated answering service, the VRU 30 waits for the "beep" or "tone", and then delivers the message left by the calling party. The VRU 30 also records the date and time the message was delivered.

When the "live" answering called party is reached, the called party is told that they have messages. The VRU 30 will play a menu which includes:

Recorded Message Menu 1. press the one key to hear the recorded message.
2. press the two key to replay the recorded message.
3. press the three to connect back to the party who left you a message.
4. press the star key for operator assistance.

However, more or fewer menu items could also be used. If the called party presses one, the recorded message from the caller is played. The called party can replay the message multiple times by pressing the two key. If the called party presses three, an attempt is made to reconnect the called party to the calling party who left the message. The called party can request operator assistance at any time by pressing the star key (i.e. for a star return). A sub-menu may be included under each of the menu items to further define available options for the called party.

If the message or page delivery is unsuccessful, (i.e. the called party didn't answer), the directory assistance center 10 records the unsuccessful delivery attempt. After a predetermined number of attempts (e.g., 10, as defined by the caller and/or the directory assistance center), the message or page delivery is canceled, and a failed message or page delivery status is recorded as described previously.

If the caller has chosen the option of having the directory assistance system contact the caller to confirm the message or page delivery, then the directory assistance center will contact the caller using the caller's phone number recorded earlier (i.e., the ANI data string from the caller's original call to the directory assistance center 10). The confirmation message will be sent immediately after a successful message or page delivery. If the message or page delivery is unsuccessful, the failure notification message will be delivered after a failure of the predetermined number of unsuccessful attempts as defined by the caller and/or directory assistance center.

Billing for Directory Assistance Services

When a caller uses any of the features described above, the caller is given an approximate idea of the cost of the service, and is asked if they agree to be billed for the service. For example, the caller may be told by the VRU 30, "A recorded message can be left for an additional $1.75 message delivery fee, plus connect time charges if any. Do you agree to accept this charge? Press one for yes or speak 'yes' now." The billing can optionally include a fee (such as the message delivery fee stated in the example), and preferably includes the cost of any connect time charges incurred when performing the service (e.g., long distance tolls and mobile phone air time charges incurred when attempting to deliver a recorded message).

If the caller agrees, the caller is billed through his/her own service provider for any costs incurred. In addition, any long distance charges, cellular, PCS, or page, charges, directory assistance charges, local connect time charges, etc. that are incurred by the directory assistance center are recorded for billing to the caller. The directory assistance center records all such transactions in their database, and then provides billing data to the appropriate service provider for the caller.

Additional Directory Assistance Options

A caller is also provided with a number of options for call backs and other message or page delivery. For example, a caller may not wish to have a non-answering or busy party call them back on the device in which they initiated the call to the directory assistance center (e.g., a cellular phone was used to call the directory assistance center, and the caller must pay for calls both to and from this cellular phone). Thus, the directory assistance center allows the caller to select from a number of options to receive a call back from a non-answering or busy party (e.g., enter the number of a land line telephone device instead of a cellular phone).

Caller Accepts Called Party Charges Service

In another embodiment of the present invention, the directory assistance center provides a service to obtain phone numbers specifically for cellular phones, PCS and other communications devices of a desired party that are not directly connected to a dedicated land telephone line. A caller can request such a number from the directory assistance operator. The directory assistance center will then try to make the proper connection to the communications device of the called party.

In yet another directory assistance service, a service is provided that allows parties to only receive calls from callers that have agreed to pay all connection and air-time charges. For example, a caller may wish to contact a called party on a mobile or cellular phone. It is typical for a party who subscribes to telephonic service for mobile or cellular phone to pay for connection and air-time for both incoming and outgoing calls. A called party may not wish to accept a call from a caller if the called party has to pay for incoming connection and air-time charges. To address this problem, the directory assistance center maintains in their databases a listing of parties who will not accept calls from a caller if the caller does not pay all charges for the call. When a caller desires to contact such a party, the directory assistance center will inform the caller that the party he/she is trying to reach will not accept a call unless the caller pays all charges. The call will be connected only if the caller agrees to pay all charges.

Option Selection by Voice

In yet another embodiment of the present invention, a caller has the option of not only pressing a key in response to any of the menus presented by the voice recognition unit, but also speaking the response to any or all menu/submenu items. For example, the menu item may say (as was shown above):

> press the one key or speak the word "one" to leave a message for this non-answering party.

The caller could then press the one key, or speak the word "one" to leave a recorded message. A voice response unit interprets spoken commands from a caller. Speaking the responses to menu questions offers advantages to cellular telephone customers who may be engaged in other activities (e.g., driving a vehicle) that make it inconvenient to press keys on the telephone keypad.

The caller also has the option of customizing the message or page delivery using voice inputs. The caller can set a number of options (e.g., number of delivery attempts, etc.) by speaking numbers associated with the menu/submenu options.

Menu Repeat Option

In some alternative embodiments of the invention, each of the above described menus can include as an option for selection by the caller (or called party for message delivery menus) to have the VRU 30 repeat the menu. This option preferably is voiced in the menu, such as by the following:

> (8) If you would like to have this menu repeated, press (or speak) eight now.

Personalized Directory Service

In a further embodiment of the invention, the directory assistance center 10 provides personalized handling of directory assistance calls based on the caller's phone number (i.e., based on the ANI data string transmitted by the telephone network to the PBX 14 with the incoming call). In particular, the PBX 14 assigns the call to an operator based on the caller's phone number. The database server preferably maintains a database of caller ANIs, which associate attribute values relating to attributes of the caller with the caller's ANI. For example, the attribute values can identify the caller's preferred language (such as Spanish for a spanish speaker), or that the caller is a preferred customer. The attribute values associated with the caller's ANI also can specify data for the voiced greetings, closings, and menus in the above described processes. For example, the caller's name, personalized sets of options for the menus, and default options for the menus can be specified.

When a call is received at the PBX 14, the PBX retrieves the attribute values associated with the ANI of the call from the database and allocates the call to an operator accordingly. For example, if the attribute value identifies the caller as being a Spanish speaker, the PBX 14 routes the call to a Spanish speaking operator. If the attribute value identifies the caller as a preferred customer, the PBX 14 routes the call to one of group of more experienced operators or prioritizes the call in call queue(s).

Additionally, the VRU 30 voices the various greetings, closings, and menus based on the caller's phone number. The VRU 30 retrieves the attributes associated with the caller's ANI from the database. The VRU 30 then voices greetings, closings, and menus personalized according to the data associated with the caller's ANI at the appropriate times in the processes shown in FIGS. 2A–2E and 3A–3E. For example, where an attributes value associated with the caller's ANI specifies the name of the caller (i.e., <caller name> in the following greeting), the VRU 30 voices greetings and closings, such as, "Hello, Mr.(Ms.) <caller name>, your directory assistance call is being handled by <service provider or operator name>, how can we help you?" As another example, where the attribute values specify default options (e.g., for connect interval, time limit, call back number, etc.) of the connect every N minutes option), the directory assistance center 10 applies these options without having the VRU 30 voice submenus to the caller for setting these options.

The attribute values to be associated with caller's phone numbers in the database (such as the phone numbers of Spanish speakers, default directory assistance options, etc.) can be obtained by the directory assistance center from the telephone provider. The telephone provider can gather this data, for example, from surveys sent with billing materials, or other means.

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. An enhanced method of providing telephone directory assistance service at a directory assistance center, comprising the steps:

(a) receiving a customer call from a calling customer using a customer telephone;

(b) connecting the calling customer to a directory assistance operator;

(c) locating a destination telephone number of a desired party wanted by the calling customer in a computer database;

(d) initiating a telephone call between the calling customer and a destination telephone having the destination telephone number responsive to operator selection of the destination telephone number;

(e) monitoring said telephone call for a ringing condition of a predetermined call status duration;

(f) after said predetermined call status duration of the ringing condition has been detected, muting the ringing signal for the calling customer while continuing to attempt to complete the telephone call between the calling customer telephone and the destination telephone;

(g) while the ringing signal is muted, playing a recorded menu of options for the calling customer, the recorded menu allowing the calling customer to select from a plurality of options with a predetermined caller input signal;

(h) monitoring said telephone call for either call completion or said predetermined caller input signal issued by the calling customer responsive to said recorded menu;

(i) if said predetermined caller input signal is detected, taking action based on said predetermined caller input signal issued by the calling customer; and (j) if call completion is detected, ceasing to play said recorded menu and allowing the call between the calling customer telephone and the destination telephone to proceed.

2. The method of claim 1 further comprising the steps of:
   after playing said recorded menu of options, returning said ringing signal to its pre-muted volume level; and
   repeating steps (e)–(j).

3. The method of claim 1 wherein the initiating step comprises selecting one of the following options: leaving a recorded voice message for a desired party, leaving a predetermined alphanumeric message for the desired party, leaving a dictated message for the desired party, calling the desired party back every N-minutes, where N-minutes is chosen by the calling customer, leaving a recorded voice page for the desired party, leaving a pre-determined alphanumeric page for the desired party, hanging up, or being returned to a directory assistance operator.

4. The method of claim 1 further comprising:
   determining whether the calling customer wishes to record a voice message for a non-answering party which will be delivered at a later time, and if so,
   terminating said telephone call to the destination telephone, and
   allowing the calling customer to record the voice message to be delivered to the non-answering party at a later time.

5. The method of claim 4 which further includes allowing the calling customer to determine how many attempts will be made to deliver the recorded voice message.

6. The method of claim 4 which further includes calling the calling customer back at a later time to confirm successful or failed recorded voice message delivery.

7. The method of claim 4 where the recorded voice message is a recorded voice page.

8. The method of claim 1 further comprising:
   determining whether the calling customer wishes to leave an alphanumeric message for a non-answering party which will be delivered at a later time, and if so,
   terminating said telephone call to the destination telephone, and
   allowing the calling party to leave an alphanumeric message to be delivered to the non-answering party at a later time.

9. The method of claim 8 in which the alphanumeric message is created by the directory assistance center from voice dictation by the calling customer.

10. The method of claim 8 in which the alphanumeric message is selected from a predetermined set of alphanumeric messages.

11. The method of claim 8 in which the alphanumeric message is an alphanumeric page.

12. The method of claim 8 which further includes calling the calling party back at a later time to confirm successful or failed alphanumeric message delivery.

13. The method of claim 8 which further includes allowing the calling customer to determine how many attempts will be made to deliver the alphanumeric message.

14. The method of claim 1 further comprising:
   determining whether said predetermined caller input signal is a return-to-operator signal, and if so,
   reassigning an operator to the calling customer,
   playing a return greeting for the calling customer, and
   re-connecting the calling customer to a directory assistance operator.

15. The method of claim 14 wherein the return-to-operator signal is a DTMF tone for the star key on a telephonic keypad.

16. The method of claim 1 in which the predetermined caller input signal is a voice response from the calling customer.

17. The method of claim 1 in which the predetermined caller input signal is a DTMF tone response.

18. The method of claim 1 which includes continuously monitoring said telephone call using a dedicated monitoring device.

19. A method of providing directory assistance service at a directory assistance center, where the directory assistance center is in communication with a calling customer, and the calling customer is identified at the directory assistance center by a calling customer telephone number, the method comprising:
   locating a destination telephone number for the calling customer;
   initiating a telephonic connection between the calling customer and a destination telephone having the destination telephone number;
   monitoring the telephonic connection for a termination signal from the calling customer; and
   upon detection of the termination signal,
   sending an alphanumeric page from the directory assistance center to the calling customer telephone number, said page including the destination telephone number and name of a party associated with the destination telephone number.

20. The method of claim 19 where the page is sent with a predetermined paging protocol.

21. The method of claim 20 where the predetermined paging protocol supports transmission of numeric and alphanumeric pages.

22. The method of claim 20 where the predetermined paging protocol supports transmission of digital information.

23. A method of providing directory assistance to a calling customer, the customer having a telephonic device for receiving and storing pages, the method comprising:
   receiving a directory assistance call at a directory assistance center from the calling customer;
   identifying a destination telephone number of a destination party;
   establishing a connection between the calling customer and the destination party; and
   upon termination of the connection by the calling customer,
   sending an alphanumeric page from the directory assistance center to be stored in the calling customer's telephonic device, said alphanumeric page including the destination telephone number and name of the destination party associated with the destination telephone number.

24. The method of claim 23 further comprising:
   retrieving the alphanumeric page stored in the calling customer telephonic device; and
   calling the called party using the information contained within the retrieved page.

25. The method of claim 23 where the alphanumeric page is sent with a predetermined paging protocol.

26. The method of claim 25 where the predetermined paging protocol supports transmission of numeric and alphanumeric pages.

27. The method of claim 26 where the predetermined paging protocol supports transmission of digital information.

28. The method of claim 23 where the calling customer telephonic device is a mobile telephone.

* * * * *